Jan. 20, 1925.

H. P. DONLE 1,523,409

AUTOMATIC SPARK CONTROL FOR GAS ENGINE IGNITERS

Original Filed March 8, 1921    3 Sheets-Sheet 1

INVENTOR
Harold P. Donle
BY
Mitchell & Allen
ATTORNEYS

Jan. 20. 1925.
H. P. DONLE
1,523,409

AUTOMATIC SPARK CONTROL FOR GAS ENGINE IGNITERS

Original Filed March 8, 1921   3 Sheets-Sheet 2

INVENTOR
Harold P. Donle
BY
Mitchell & Allen
ATTORNEYS

Jan. 20, 1925.

H. P. DONLE 1,523,409

AUTOMATIC SPARK CONTROL FOR GAS ENGINE IGNITERS

Original Filed March 8, 1921    3 Sheets-Sheet 3

INVENTOR
Harold P. Donle
BY
Mitchell & Allyn
ATTORNEYS

Patented Jan. 20, 1925.

1,523,409

UNITED STATES PATENT OFFICE.

HAROLD POTTER DONLE, OF MERIDEN, CONNECTICUT, ASSIGNOR TO THE CONNECTICUT TELEPHONE & ELECTRIC COMPANY, INC., OF MERIDEN, CONNECTICUT, A CORPORATION OF CONNECTICUT.

AUTOMATIC SPARK CONTROL FOR GAS-ENGINE IGNITERS.

Application filed March 8, 1921, Serial No. 450,727. Renewed September 5, 1924.

*To all whom it may concern:*

Be it known that I, HAROLD POTTER DONLE, a citizen of the United States of America, residing at Meriden, Connecticut, have invented a new and useful Automatic Spark Control for Gas-Engine Igniters, of which the following is a specification.

My invention relates to ignition mechanism for internal combustion engines. My object is to provide simple and reliable means whereby the ignition "spark" may be advanced and retarded wholly by automatic action and in accordance with load demand on the engine. It is primarily an improvement on that type of spark controlling apparatus disclosed in the application of G. Wirrer, Serial No. 695,803, filed May 3, 1912; and in the patent to Nickerson No. 1,139,707, dated May 18th, 1915. In carrying out my invention I utilize the suction or vacuum in the intake pipe of the engine as the source of power, but I have found it necessary in the interest of efficiency to so modify that suction or vacuum that its effective pressure on the automatic spark controlling means will be less than that actually existing in the intake pipe of the engine, except perhaps in the rare instance of wide open throttle. The reasons for this will later appear. I effect this modification by providing a variable leak in a passage of fixed capacity leading from the engine intake pipe to the spark controlling element. By my improvement I am enabled to do entirely away with any means for manually adjusting the spark timing device, and this is of great importance because any independent manual adjustment of the spark timer during the operation of the engine will defeat the successful automatic operation of the spark controller. Manifestly, any automatic means for controlling the spark must be initially set at the theoretically correct starting position which of course will vary with engines of different design. From this starting position the automatic means will work arbitrarily. If a manual adjustment is provided which operates on the spark timer independently of the automatic adjustment it will of necessity, if moved, destroy said correct initial adjustment and thereby throw the automatic means out of adjustment with the motor. I am aware that there are some instances where a spark timer is controlled both automatically and manually, but in such cases it is essential to success that the action shall be an interrelated action wherein both the manual and the automatic means dependently cooperate in accomplishing the desired result. Such combined manual and automatic spark controlling means are more or less intricate and complicated, and one of my objects is to avoid such complications and difficulties.

Figure 1:
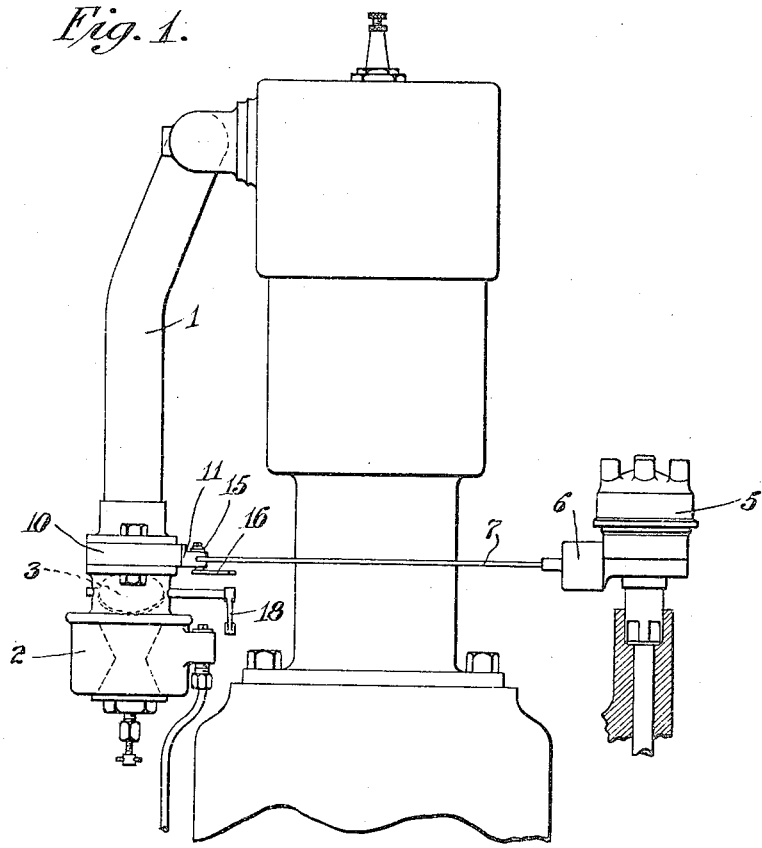
Fig. 1 is an end view of a motor partly broken away and showing conventionally my invention as applied thereto.
Figure 2:
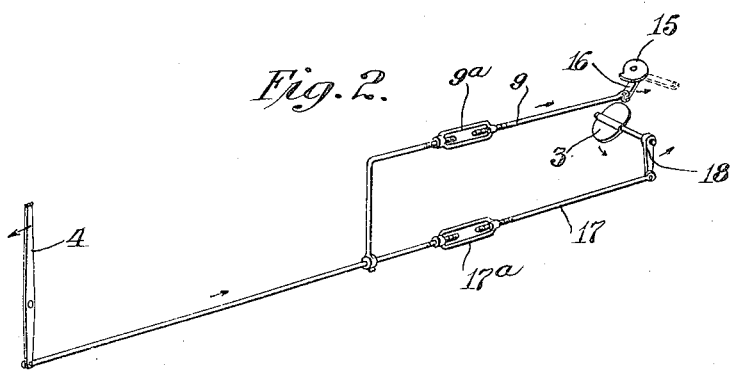
Fig. 2 is a diagrammatic view showing certain connections.

1 represents the intake pipe of an internal combustion motor which pipe is designed to feed fuel to the motor from the usual vaporizer or carbureter 2. 3 is the usual throttle valve in the intake pipe 1. This valve is manually operable through the medium of the usual throttle lever 4 which may be connected to the valve by any suitable linkage. 5 represents an igniter which is so constructed that by shifting the so-called "timer" portion thereof properly, the spark (by which the explosive charge in the engine is ignited) may be advanced or retarded to the proper degree to give the greatest efficiency. The timer moving or controlling means is preferably a piston, movable in cylinder 6, the position of which piston is varied by changes in vacuum. One end of the cylinder 6 is connected by a pipe 7 of fixed capacity with the intake pipe 1, said connection being made at a point beyond the usual "venturi" contraction therein. Manifestly, any suction or partial vacuum created in the intake pipe beyond said "venturi" will tend to exhaust air from the cylinder 6 and to move the piston therein. In general, the mechanism which I have thus far described is disclosed in the before mentioned application and patent. In addition to what is disclosed in said Nickerson patent, I provide a variable bleed hole or vent 8 in the pipe 7 which tends to partially break the vacuum in the cylinder 6 so that, under normal operation, said vacuum will necessarily be less than the vacuum in the intake pipe 1. Such a vent or bleed, broadly speaking, is disclosed in the aforesaid Wirrer application, but in my construction I provide a valve or other suitable means for varying the size of the vent under varying load conditions while running, so as to modify the degree to which the vacuum will be broken within the cylinder 6 relatively to that in the intake pipe. I preferably connect this vent controlling means in any suitable way with the throttle lever 4, as by an extension link 9. It thus follows that when the throttle valve is moved to control the freedom with which gas may pass through the intake pipe, the size of the vent 8 will also be varied. Inasmuch as the degree of vacuum in the intake pipe varies in accordance with load it is most important to control the timer by said vacuum, but to secure the most satisfactory results I have found it important to employ the aforesaid variable vent. Accordingly, by working from this vacuum, with the proper modifying means, I am enabled to secure the correct automatic positioning of the timer so that the spark will occur in the engine cylinder with the proper degree of "advance" relatively to load.

It will assist in understanding the operation of the apparatus to briefly describe how it would work under certain different conditions. Let us assume for example, that the device is mounted on an automobile engine, that the engine is in motion, and the vehicle is traveling over a smooth level road, representing a uniform load. The size of the vent in the air line leading to the timer adjusting means will be determined by the position of the then stationary throttle lever 4. Now, assume a hill is reached. The moment the vehicle encounters the hill the load will be relatively increased and if the throttle is permitted to remain in the same position, the engine will necessarily slow down. This will obviously result in a decrease in the vacuum in the intake pipe and this in turn will lessen the vacuum in cylinder 6 so that the piston therein will move in a direction to retard the spark, which is correct, in view of the fact that the load is increased. Again, assume the same conditions and assume the vehicle is approaching the same hill up which it is desired to maintain the same speed. When the hill is reached the throttle lever 4 is moved so as to feed sufficiently more gas to maintain the same speed under the added load. This opening of the throttle is accompanied by a corresponding movement of the vent 8 in a closing direction. With the opening of the throttle to feed more gas to the engine to meet the heavier load, the vacuum in the intake pipe is decreased, and this would result in the undue retarding of the spark were it not for the fact that the vent has been simultaneously partly closed so as to relatively increase the effective pressure in the cylinder 6 sufficient to position the timer correctly for the increased load condition then obtaining, which position may be less advanced than before but still properly advanced to permit of full flame propagation by the time the engine piston reaches top center. Again, assume the same starting conditions and assume that the vehicle is approaching a descending hill. When the vehicle reaches the hill and starts down, the load is relatively lessened. Since the load is less, it follows that the vehicle and engine will run faster and this lessened load will therefore induce a greater vacuum in the intake pipe which will be felt in the interior of the cylinder 6 causing the piston therein to automatically move in a direction to advance the spark, which is proper with the decreased load.

It will thus be seen that, viewed from all three various angles of operation, it is possible to secure, by automatically operating means alone, the advancing and retarding of the spark to the desired degree depending fundamentally upon the load conditions encountered.

In the practical operation of an internal combustion motor for automobile use wherein the loads vary greatly and frequently, it is important to have a spark controlling device which is quickly responsive. In the operation of my improved apparatus this response is quick and certain under all conditions. Again, in the average use of motors on automobiles the engine is running the greater portion of the time with a relatively light load or no load and at slow speed, that is to say, nowhere near the maximum. To save in fuel consumption and to avoid overheating the engine, it is necessary that the spark should stand in an advanced position instead of in a retarded position, as far as possible, because a retarded spark, under such conditions, means a loss of power and a lessening of efficiency. To that end, it will be seen that even though the engine is running slowly, and on little or no load, the operation of the automatic spark controlling means is in a direction to advance the spark to the greatest degree possible without causing "pre-ignition" so-called. It will be observed that I employ no means aside from the single vacuum controlled means for automatically shifting the ignition upon the increase or decrease of load on the engine and that movement is accomplished solely by said vacuum controlled means.

Figure 3:
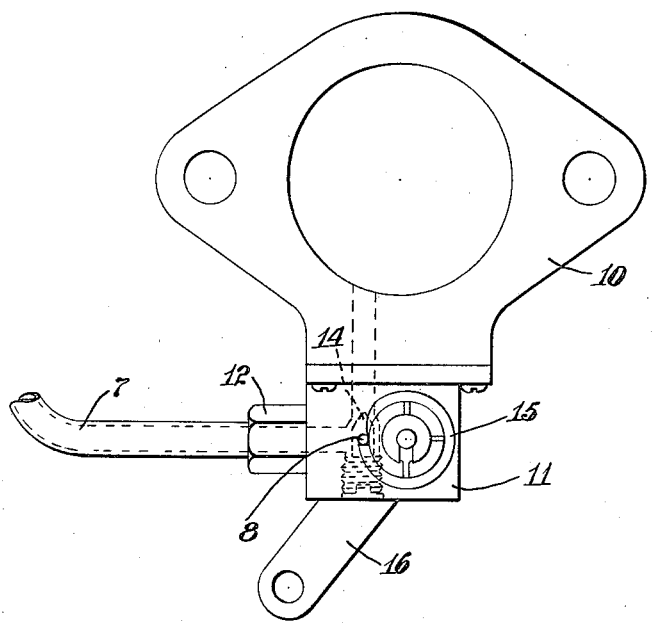
Fig. 3 is a plan view of certain details of construction relatively enlarged.
Figure 4:
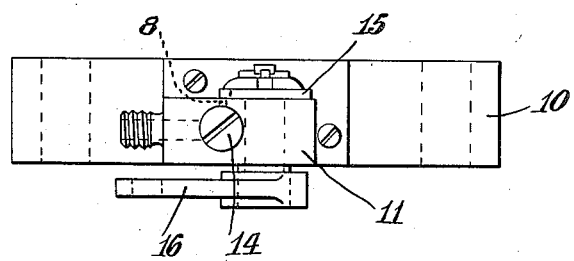
Fig. 4 is an edge elevation of the parts shown in Fig. 3.

Turning again to the drawings, I will describe more in detail the various parts shown therein. First with relation to the vacuum means, I have devised a convenient construction which may be easily associated with the ordinary engine the same comprising a flat body portion 10 of substantially the outline of the usual flanges by which the carbureter is connected to the intake pipe. This body 10 has a central passage of the same size and in line with the intake pipe and is secured between the flanges of the intake pipe and the carbureter as shown in Fig. 1. At one side of the body 10 is secured an extension 11. The pipe 7 is secured by a gland or coupling 12 to a nipple on one side of said extension. The body 10 and extension 11 are bored to continue the passage in pipe 7 to the intake 1. As shown, this passage is angular to facilitate the use of an adjusting needle valve 14 by which the capacity of the pipe may be varied to adapt the apparatus to engines of different types. When this adjustment has been determined upon for any particular engine, no further change in the needle valve is required. Obviously, if the devices were to be used on one size and style of engine the needle valve might be dispensed with since the pipe 7 could be initially made of the proper size to fit such an engine. As shown in Fig. 3, the vent 8 taps into the passage from the top of the extension 11, and mounted thereon is a rotary valve 15 movable by a lever 16. The edge of the valve 15 is cam shaped or eccentric so that by turning the same more or less it will open and close the vent 8 and thereby vary the size of the same and the degree to which the vacuum in the passage through the pipe 7 is broken by the admission of atmospheric air. Obviously, this valve may be modified in a great variety of ways. In fact, all of the details are susceptible of a wide range of modification and change, the form shown, however, being in many respects preferable because of its simplicity and compactness.

The throttle lever 4, which may be located at any desired place, is connected as I have before mentioned by means of an extension link 9 to the vent valve 15, the said link 9 in this instance being connected to the end of the lever 16. 9ª is a turn-buckle by which the length of the link may be adjusted as desired for the purpose of controlling the adjustment of the vent valve 15.

The throttle lever 4 is connected by means of an extension 17 with a lever 18 carried by the throttle valve shaft in the usual manner. 17ª is a turn-buckle by which this extension may be adjusted as to length for the purpose of controlling the adjustment of the throttle valve 3.

Figure 5:
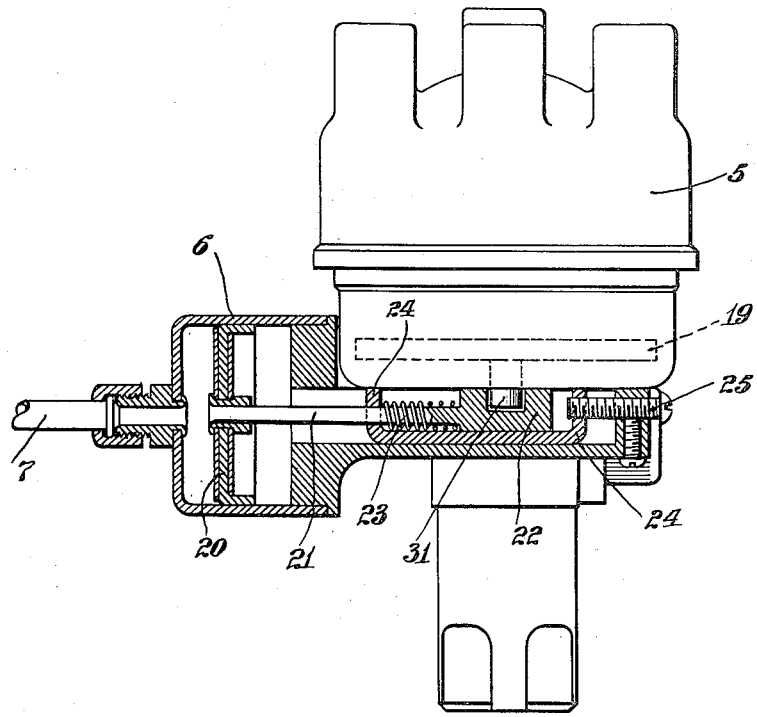
Fig. 5 is a detail view partly in section of other parts.
Figure 6:
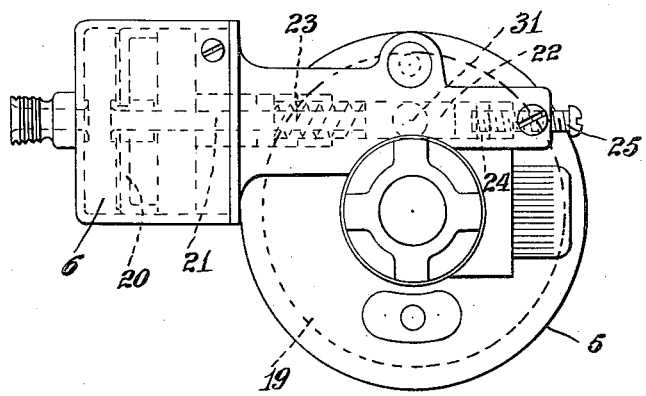
Fig. 6 is a view of the underside of the parts shown in Fig. 5.

In Figs. 5 and 6, I have shown an "igniter," so-called, which may be of the same general construction as set forth in the Wilcox & Cavanagh Patent, #1,204,104, of November 7th, 1916, to which reference may be had for a full disclosure of details not herein shown or described. This igniter includes timer and distributer elements. By shifting the "timer" angularly with relation to the cam shaft, the spark is advanced and retarded. In this instance, the timer mechanism is mounted upon what is termed a "breaker plate" 19 located within the igniter housing and carrying the make and break contact devices (not shown herein). This plate, with its contact devices is adjusted angularly around the cam shaft so as to advance or retard the spark. The plate 19 is provided with a depending stud 31 which projects through a slot on the underside of the igniter housing. This stud 31 is engaged by a movable element for the purpose of adjusting the angular position of said breaker plate. 20 is the aforesaid piston located in the cylinder 6. In this instance, the piston has an extension 21 which carries a cross-head 22. Into the slot of the cross-head the end of the stud 31 projects, as shown in Fig. 5. 23 is a spring surrounding the extension 21 and bearing at one end against the cross-head and at the other end against an abutment 24. This abutment is mounted upon a slide controlled by an adjusting screw 25. The spring 23 is normally under compression so that its tendency is to move the cross-head 22 (and necessarily the piston 20) to the right, as viewed in Fig. 5. This movement is in a direction to retard the spark. When the engine is running and a vacuum is created within the outer end of the cylinder 6 where the pipe 7 enters the same, the piston 20 will be drawn to the left in opposition to the action of the spring 23, and this movement will tend to advance the spark. The degree to which the spark is advanced depends upon the degree of effective vacuum within the cylinder 6 and this, of course, depends upon the degree of pull of the vacuum within the intake pipe 1 as modified by the variable vent 8.

The particular form of "igniter" is, of course, immaterial since my improved vacuum operated timer controlling apparatus may be associated with any of the known types of igniters which are constructed so that the spark may be advanced and retarded thereby.

As I have before stated, the passage leading from the intake pipe to the interior of the cylinder has a certain fixed capacity depending upon the particular type and style of engine with which the apparatus is to be employed. This capacity element is not varied when once established for a given engine, but the effective air tension working on the piston 20 is modified with relation to that tension actually existing in the intake pipe under normal running conditions by the admission of more or less atmospheric air. In this way, the range of movement of the piston is likewise modified as compared with what it would be if the effective air tension on the piston 20 corresponded to that existing in the intake. If the air tension on the piston 20 corresponded to the air tension in the intake pipe under the normal running conditions, the action would correspond to that of the controller shown in the aforesaid Nickerson patent, and I have found that greater efficiency can be attained by my improved construction than is possible of attainment in a construction of the aforesaid Nickerson type. To merely change the size of the passage leading from the intake to the piston 20 will not produce the results attained by my improvement, nor will the functioning be the same, because, even if the passage leading to the cylinder 6 is diminished the effective tension on the piston therein will still correspond with the tension existing in the intake pipe under all normal running conditions. While a contraction, for instance, in such passage, might tend to delay momentarily, and very slightly, the speed of movement of the piston 20, it would not modify the relative range of movement therein, because it is perfectly obvious that no matter what the size of the passage is leading from the intake to the cylinder 6, the vacuum condition in the cylinder 6 will very quickly correspond to that existing in the intake, and the range of movement of the piston, therefore, will always be in exact relationship to the vacuum existing in the intake pipe, whereas by my improvement, the range of movement of the piston is effected by the degree to which the effective vacuum in the cylinder 6 is modified by the vent and will not correspond to that which would be induced by actual intake suction. My improvement contemplates the venting of the passage throughout the full range of normal operation of the engine, but it may facilitate quick and accurate adjustment of the parts to have the vent just closed, or practically closed, when the throttle is in the extreme wide open position, a condition which rarely occurs in the operation of the engine, since the motor is seldom working to the limit of its capacity.

As I have heretofore endeavored to make clear, I do not wish to limit myself to the particular means illustrated and specifically described herein, since I am aware that many changes may be made. However, the particular means shown herein are decidedly preferable because of their great simplicity of construction and the ease with which they may be attached to a motor and igniter equipment.

I claim:

1. In an internal combustion motor, an intake passage in which suction is created by the operation of said engine, an ignition timer, movable means for shifting said timer for timing the ignition, said movable means being moved by the suction created in the intake pipe, with a vent to atmosphere for variably controlling the effective suction on said timer shifting means whereby the same will be different from the suction simultaneously existing in the intake pipe incidental to different load conditions occurring during the normal running of the engine, said means operating to cause the effective tension on the movable means to correspond substantially with the suction in the intake pipe when the engine throttle is substantially wide open.

2. In an internal combustion motor, an intake passage in which suction is created by the running of the motor, an igniter including a movable timer element for timing the ignition, a movable device connected with said movable timer element, means for moving said device to and fro and including a suction chamber, a connection between said chamber and the intake passage, a vent in said connection, a throttle in said intake pipe and means for varying the size of said vent in accordance with the throttle position.

3. In an internal combustion motor, an intake passage in which suction is created by the running of the motor, an igniter including a movable timer element for timing the ignition, a movable device connected with said movable timer element, means for moving said device to and fro and including a suction chamber, a connection between said chamber and the intake passage, a vent in said connection, a throttle in said intake pipe and means for varying the size of said vent in accordance with the throttle position, said vent being contracted as said throttle is being opened and vice versa.

4. In an internal combustion motor, an intake pipe in which suction is produced by the running of the engine, timer mechanism for controlling the timing of the ignition spark, a cylinder, a piston therein connected with said timer mechanism, means for moving the said piston and timer mechanism in a direction to retard the spark, a passage leading from said cylinder to said intake whereby the suction in the intake will move said piston in an opposite direction to advance the spark, a variable vent in said passage for modifying the range of piston movement in the last mentioned direction relatively to the range of movement that would be induced by the actual suction existing in the intake pipe.

5. In an internal combustion motor, an intake pipe in which suction is produced by the running of the engine, timer mechanism for controlling the timing of the ignition spark, a cylinder, a piston therein connected with said timer mechanism, means for moving the said piston and timer mechanism in a direction to retard the spark, a passage leading from said cylinder to said intake whereby the suction in the intake will move said piston in an opposite direction to advance the spark, a vent in said passage with means for varying the size thereof for modifying the range of piston movement in the last mentioned direction relatively to the range of movement that would be induced by the actual suction existing in the intake pipe, said means operating to close said vent when the throttle in said intake pipe stands substantially wide open.

6. An automatic timer controlling apparatus for spark igniters for internal combustion motors comprising, means connected to said timer and movable to and fro for advancing and retarding the spark, a chamber adjacent to said means, with means for putting said chamber into communication with the engine intake pipe, a vent to atmosphere for said connecting means, and means including a throttle for varying the effective size of said vent during and relative to changes of vacuum in said intake pipe incidental to changes in the normal operation of the engine, whereby the effective tension conditions in said chamber will be modified relatively to the tension conditions existing simultaneously in said intake.

7. An automatic timer controlling apparatus for spark igniters for internal combustion motors comprising, a cylinder, a piston movable therein, means for moving said piston therein including a suction connection adapted to be connected with the intake pipe of the motor, a variable vent in said suction connection, with means for varying the size of said vent, and operative connections between said vent varying means and the engine throttle operating means, whereby said vent will be varied in size in accordance with different throttle positions.

8. An automatic timer controlling apparatus for spark igniters for internal combustion motors comprising, a cylinder, a piston movable therein, means for moving said piston therein including a suction connection adapted to be connected with the intake pipe of the motor, a variable vent in said suction connection, with means for varying the size of said vent, and operative connections between said vent varying means and the engine throttle operating means, whereby said vent will be varied in size in accordance with different throttle positions, said means operating to contract said vent as the throttle is opened and vice versa, whereby the effective suction on the timer controlling means will be modified relatively to the actual suction in the intake pipe.

9. An automatic timer controlling apparatus for spark igniters for internal combustion motors comprising, a cylinder, a piston movable therein, means for moving said piston therein including a suction connection adapted to be connected with the intake pipe of the motor, a variable vent in said suction connection, with means for varying the size of said vent, and operative connections between said vent varying means and the engine throttle operating means, whereby said vent will be varied in size in accordance with different throttle positions, said means operating to contract said vent as the throttle is opened and vice versa, whereby the effective suction on the timer controlling means will be modified relatively to the actual suction in the intake pipe, and means for adjusting the size of the passage whereby the same may be initially set for engines of different types and styles.

10. In an internal combustion motor, an intake pipe, a varporizer connected thereto, means interposed between said pipe and carbureter and having a lateral extension, a passage through said means and lateral extension, said passage tapping into said intake pipe, a vent in said extension tapping into said passage therein, means carried by said extension for varying the size of said vent, a spark timer and suction controlled means connected therewith for operating the timer, said passage in said extension being connected with said suction controlled means, a throttle for said inlet pipe, means for operating said throttle and for simultaneously operating the means for varying the size of said vent in accordance with throttle position.

11. In an internal combustion motor, an intake pipe, a vaporizer connected thereto, means interposed between said pipe and carbureter and having a lateral extension, a passage through said means and lateral extension, said passage tapping into said intake pipe, a vent in said extension tapping into said passage therein, means carried by said extension for varying the size of said vent, a spark timer and suction controlled means connected therewith for operating the timer, said passage in said extension being connected with said suction controlled means, a throttle for said inlet pipe, means for operating said throttle and for simultaneously operating the means for varying the size of said vent in accordance with throttle position, and means for adjusting the relative throw of the throttle and vent controlling means.

12. An ignition controlling means comprising a chamber with means for connecting the interior of the same with the intake pipe of an internal combustion engine at a point between the throttle and the engine intake valve, a movable element in said chamber for connection with the timer to control the position of the latter, said movable element being moved by the suction created in said chamber, a vent between said movable element and said intake pipe with means for controlling said vent for modifying the effect of the intake suction on said movable element, said means including a valve for said vent, and means for connecting said valve to the throttle controlling means.

HAROLD POTTER DONLE.